(12) United States Patent
Kaizu et al.

(10) Patent No.: US 9,160,438 B2
(45) Date of Patent: Oct. 13, 2015

(54) RECEIVING DEVICE AND METHOD

(71) Applicant: Mitsubishi Electric Corporation, Tokyo (JP)

(72) Inventors: Aki Kaizu, Tokyo (JP); Yukihiro Kadota, Tokyo (JP); Tsutomu Asahina, Tokyo (JP); Daisuke Shimbo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/323,668

(22) Filed: Jul. 3, 2014

(65) Prior Publication Data

US 2015/0010046 A1 Jan. 8, 2015

(30) Foreign Application Priority Data

Jul. 5, 2013 (JP) .................................. 2013-141718
Apr. 22, 2014 (JP) .................................. 2014-087806

(51) Int. Cl.
*H04L 1/20* (2006.01)
*H04B 7/08* (2006.01)
*H04L 27/01* (2006.01)
*H04L 25/02* (2006.01)
*H04L 1/06* (2006.01)
*H04L 1/04* (2006.01)

(52) U.S. Cl.
CPC ................ *H04B 7/0885* (2013.01); *H04L 1/04* (2013.01); *H04L 1/0631* (2013.01); *H04L 1/20* (2013.01); *H04L 25/0204* (2013.01); *H04L 27/01* (2013.01)

(58) Field of Classification Search
CPC ............... H04L 5/00; H04L 1/02; H04L 1/06; H04L 1/0631; H04L 1/20; H04L 1/04
See application file for complete search history.

(56) References Cited

U.S. PATENT DOCUMENTS

| 5,530,725 | A  | * | 6/1996  | Koch ............................ 375/347 |
| 5,727,032 | A  | * | 3/1998  | Jamal et al. .................... 375/347 |
| 7,362,832 | B2 |   | 4/2008  | Yoshida |
| 8,576,902 | B2 |   | 11/2013 | Maruyama et al. |
| 2006/0165197 | A1 |   | 7/2006  | Morita et al. |
| 2007/0071150 | A1 | * | 3/2007  | Yang et al. ..................... 375/347 |
| 2008/0075158 | A1 | * | 3/2008  | Li .................................. 375/232 |
| 2009/0097576 | A1 | * | 4/2009  | Adachi et al. ................. 375/260 |

(Continued)

FOREIGN PATENT DOCUMENTS

EP  1 301 003 A1   4/2003
JP  2000-286821 A  10/2000

(Continued)

*Primary Examiner* — Jean B Corrielus
(74) *Attorney, Agent, or Firm* — Birch, Stewart, Kolasch & Birch, LLP (57) ABSTRACT

A digital broadcast receiver receives a digital broadcast signal through a plurality of antennas, orthogonally demodulates the received signals, performs channel estimation by detecting a delay profile from a known signal included in each of the orthogonally demodulated signals, and uses the channel estimation results to equalize data signals included in the orthogonally demodulated signals. The delay profiles are also used to estimate the signal quality of each of the equalized data signals by determining the power of the signal component and the power of the noise component in each delay profile and calculating a signal to noise ratio. Diversity combining is performed by weighting the equalized data signals on a basis of their estimated signal quality.

14 Claims, 8 Drawing Sheets

(56) References Cited

U.S. PATENT DOCUMENTS

| | | | |
|---|---|---|---|
| 2009/0097577 A1* | 4/2009 | Adachi et al. | 375/260 |
| 2009/0207927 A1* | 8/2009 | Watanabe et al. | 375/260 |
| 2014/0064350 A1* | 3/2014 | Krauss et al. | 375/232 |

FOREIGN PATENT DOCUMENTS

| | | | |
|---|---|---|---|
| JP | 2003-110521 A | 4/2003 |
| JP | 2004-158933 A | 6/2004 |
| JP | 2004-208254 A | 7/2004 |
| JP | 4071468 B2 | 4/2008 |
| JP | 2011-199391 A | 10/2011 |
| JP | 2012-94982 A | 5/2012 |
| JP | 2012-238955 A | 12/2012 |
| JP | 2013-192107 A | 9/2013 |

* cited by examiner

DELAY PROFILE (COMPARISON RENGE)

RECEIVING DEVICE AND METHOD

BACKGROUND OF THE INVENTION

1. Field of the Invention

This invention relates to a receiving device and a receiving method.

2. Description of the Related Art

It is known that reception performance in mobile and other communications that are susceptible to fading, a phenomenon in which the received signal varies greatly over time, can be improved by a diversity scheme in which signals received from multiple antennas are combined. This technique improves reception performance by combining received signals including independent noise to reduce the noise effect.

There is a maximal ratio combining (MRC) method of obtaining a diversity combination output c in a receiving device having N antennas (where N is a natural number equal to or greater than 2) in which, as indicated in equation (1) below, the distortions experienced by the N received signals on their respective channels are estimated, the power values ($p_1$ to $p_N$) of the channel estimation results are normalized, and the received signals ($d_1$ to $d_N$) are weighted by the normalized values and then summed.

$$c = \sum_{i=1}^{N} k_i d_i \quad (1)$$

$$\left( k_i = p_i \bigg/ \sum_{j=1}^{N} p_j \right)$$

Reception performance can be further improved by weighting the signals $d_1$-$d_N$ with the normalized products of the power values $p_1$-$p_N$ resulting from channel estimation and values ($w_1$ to $w_N$) resulting from signal quality estimation as in the following equation (2)

$$c = \sum_{i=1}^{N} l_i d_i \quad (2)$$

$$\left( l_i = p_i w_i \bigg/ \sum_{j=1}^{N} p_j w_j \right)$$

A receiver described in Japanese Patent Application Publication No. 2003-110521 uses the carrier to noise (C/N) ratio obtained from the known signal estimation result as the result of signal quality estimation and perform diversity combination in a receiver with a plurality of antennas as in equation (2), estimating the C/N ratios from the squares of the distances of the results of known signal equalization to the closest ideal signal points.

SUMMARY OF THE INVENTION

There are terrestrial digital broadcasting formats in which the known signal is transmitted on a single carrier. This type of transmission symbol format has been adopted in, for example, the Chinese Digital Terrestrial Multimedia Broadcasting (DTMB) standard.

When a terrestrial digital broadcast that transmits the known signal on a single carrier separate from the data signal is received, the receiver disclosed in Japanese Patent Application Publication No. 2003-110521 must equalize the known signal transmitted on the single carrier in order to estimate the C/N ratio from the known signal estimation result.

However, the circuit used to equalize the data signal, which is transmitted on multiple carriers, cannot equalize a known signal transmitted on a single carrier. To estimate the C/N ratio, a separate circuit is needed to equalize the known signal transmitted on the single carrier.

An object of the present invention is accordingly to estimate signal quality and perform diversity combination without providing a separate circuit to equalize the known signal, even in transmission systems that transmit the known signal on a single carrier.

A receiving device according to one aspect of the invention includes a plurality of demodulating modules that receive a digital broadcast signal through a plurality of antennas, and a combiner that performs diversity combining based on respective outputs of the demodulating modules. The digital broadcast signal includes a data signal and a known signal. The known signal is transmitted on a single carrier separate from the data signal.

Each of the plurality of demodulating modules includes an orthogonal demodulator, a channel estimator, a signal equalizer, and a signal quality estimator. The orthogonal demodulator orthogonally demodulates the signal received at one of the antennas. The channel estimator detects a delay profile from the known signal included in the signal orthogonally demodulated by the orthogonal demodulator, and uses the detected delay profile to perform channel estimation, thereby generating a channel estimation result. The signal equalizer uses the channel equalization result to equalize the data signal included in the signal orthogonally demodulated by the orthogonal demodulator, and supplies the equalized data signal to the combiner. The signal quality estimator estimates signal quality from the ratio of the power of the signal component included in the delay profile detected by the channel estimator to the power of the noise component included in the delay profile detected by the channel estimator, and supplies the result of this estimation of the signal quality to the combiner.

The signal quality estimator includes a signal power determiner, a noise power determiner, and a signal quality calculator. The signal power determiner determines the power of the signal component included in the delay profile detected by the channel estimator. The noise power determiner determines the power of the noise component included in the delay profile detected by the channel estimator. The signal quality calculator calculates the signal quality as the ratio of the power of the signal component determined by the signal power determiner and the power of the noise component determined by the noise power determiner. In performing diversity combining, the combiner weights the data signals equalized by the demodulation modules on a basis of the signal qualities obtained from the demodulation modules.

A receiving method according to another aspect of the invention is used to receive a digital broadcast signal including a data signal and a known signal, the known signal being transmitted on a single carrier separate from the data signal. The method includes the steps of: receiving the digital broadcast signal through a plurality of antennas to obtain a corresponding plurality of received signals; orthogonally demodulating each of the received signals to obtain a plurality of orthogonally demodulated signals including respective data signals and known signals; performing channel estimation by detecting a delay profile from the known signal included in each of the orthogonally demodulated signals, thereby generating a corresponding channel estimation result; equalizing the data signal in each of the orthogonally demodulated signals by using the corresponding channel estimation result, thereby obtaining a plurality of equalized data signals; estimating the signal quality of each of the equalized data signals from the delay profile detected during channel estimation, thereby obtaining a plurality of signal quality estimates; and performing diversity combining by weighting the equalized data signals on a basis of the signal quality estimates and combining the weighted equalized data signals. The step of estimating the signal quality of each one of the equalized data signals includes determining the power of the signal component included in the delay profile, determining the power of the noise component included in the delay profile, and calculating the ratio of the power of the signal component to the power of the noise component.

One aspect of the invention enables diversity combining to be performed on a basis of estimated signal quality without providing a separate circuit to equalize the known signal, even in transmission systems in which the known signal is transmitted on a single carrier.

DETAILED DESCRIPTION OF THE INVENTION

Embodiments of the invention will now be described with reference to the attached drawings.

First Embodiment

Figure 1:
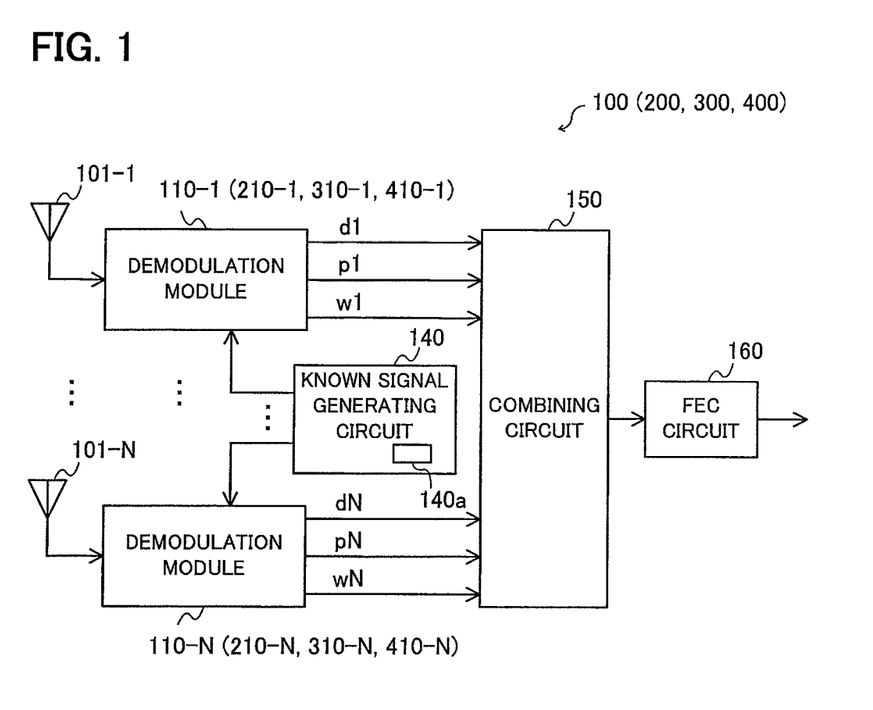
FIG. 1 is a block diagram schematically showing the structure of a receiving device in first to fourth embodiments of the invention.

Referring to FIG. 1, the receiving device 100 in the first embodiment has N demodulation modules 110-1 to 110-N, a known signal generating circuit 140 used as a known signal generating unit, a combining circuit 150 used as a combining unit, and a forward error correction (FEC) circuit 160 used as an error correcting unit. The demodulation modules 110-1 to 110-N are connected to respective antennas 101-1 to 101-N, from which they receive a digital broadcast in which the known signal is transmitted on a single carrier, separate from the data signal. There are accordingly N antennas. Incidentally, the numbers in parentheses in FIG. 1 will be used in the second to fourth embodiments.

The antennas 101-1 to 101-N receive the digital broadcast signal and supply the broadcast signal to each of the demodulation modules 110-1 to 110-N.

From the broadcast signal received by the antennas 101-1 to 101-N, the demodulation modules 110-1 to 110-N obtain signal equalization results $d_1$ to $d_N$, power values $p_1$ to $p_N$ resulting from channel estimation, and values $w_1$ to $w_N$ resulting from signal quality estimation, and supply these values to the combining circuit 150.

Since the N demodulation modules 110-1 to 110-N are structurally identical, demodulation module 110-$i$ (where $i$ is a natural number such that $1 \leq i \leq N$) will be described below as a representative one of the N demodulation modules 110-1 to 110-N.

Figure 2:
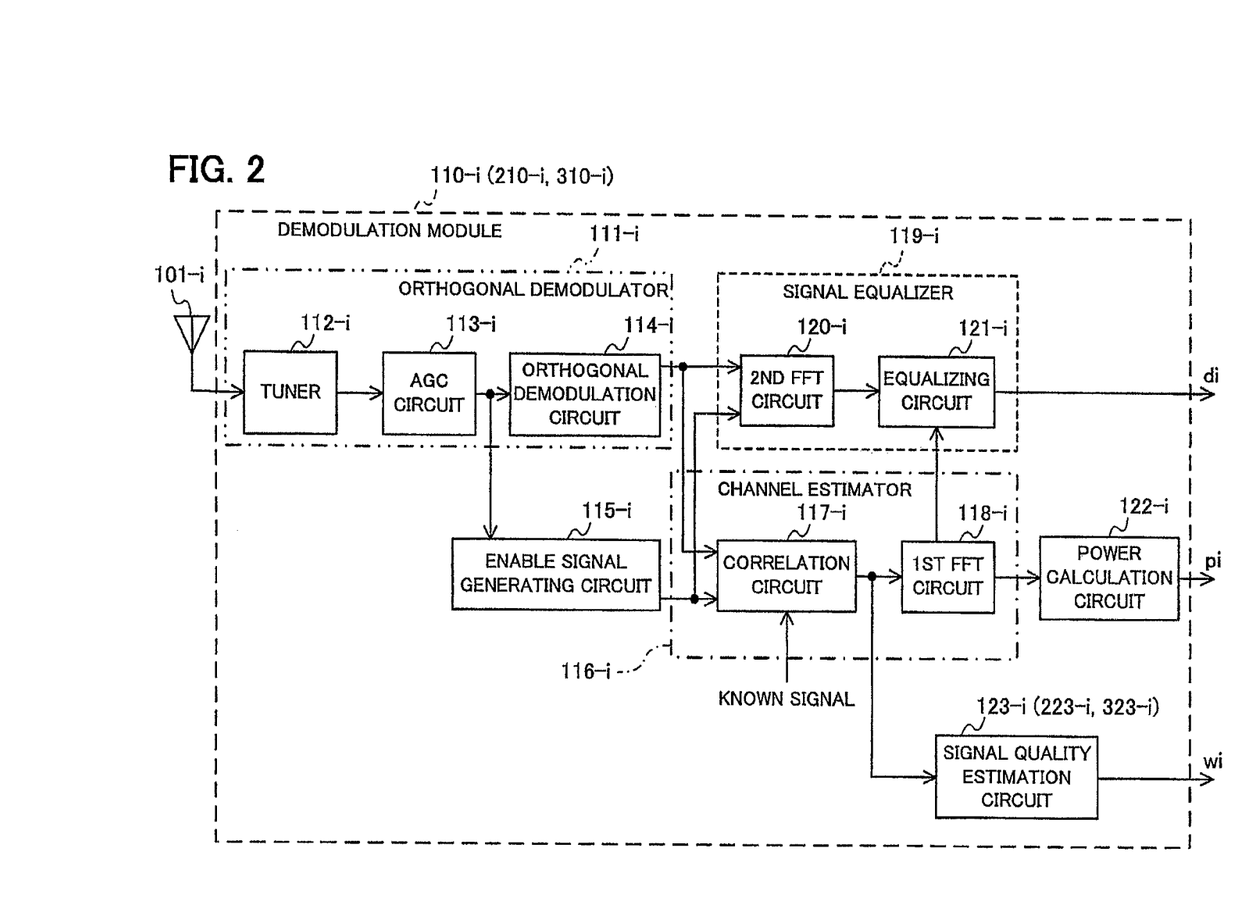
FIG. 2 is a block diagram schematically showing the structure of the demodulation modules in the first to third embodiments.

FIG. 2 is a block diagram schematically showing the structure of demodulation module 110-$i$.

Demodulation module 110-$i$ has an orthogonal demodulator 111-$i$, an enable signal generating circuit 115-$i$, a channel estimator 116-$i$, a signal equalizer 119-$i$, a power calculation circuit 122-$i$ used as a channel power calculator, and a signal quality estimation circuit 123-$i$ used as a signal quality estimator. Incidentally, the reference characters in parentheses in FIG. 2 apply to the second and third embodiments.

The orthogonal demodulator 111-$i$ generates an orthogonally demodulated signal by orthogonally demodulating the received signal received through antenna 101-$i$. The orthogonal demodulator 111-$i$ supplies the generated orthogonally demodulated signal to the channel estimator 116-$i$ and signal equalizer 119-$i$.

As shown in FIG. 2, the orthogonal demodulator 111-$i$ has a tuner 112-$i$, an AGC (Automatic Gain Control) circuit 113-$i$ used as a gain adjuster, and an orthogonal demodulation circuit 114-$i$ used as an orthogonal demodulator.

From the broadcast signal supplied from antenna 101-$i$, the tuner 112-$i$ selects which received signal to receive and supplies the selected received signal to the AGC circuit 113-$i$. The received signal includes a part corresponding to a data signal transmitted on multiple carriers, and a part corresponding to a known signal transmitted on a single carrier.

The AGC circuit 113-$i$ adjusts the received signal received through antenna 101-$i$ to a predetermined signal level. For example, the AGC circuit 113-$i$ includes an amplifier and automatically controls the control voltage of the amplifier to keep the amplified output signal level at a predetermined reference level even if the input signal level changes. When the input signal level is lower than the predetermined reference level, the AGC circuit 113-$i$ increases the control voltage, thereby increasing the amplified signal level. When the input signal level is higher than the predetermined reference level, the AGC circuit 113-$i$ reduces the control voltage, thereby decreasing the amplified signal level. The signal level of the signal output from the AGC circuit 113-$i$ therefore always has a value close to the predetermined reference signal level. The received signal adjusted to the predetermined signal level by the AGC circuit 113-$i$ is supplied to the orthogonal demodulation circuit 114-$i$ and enable signal generating circuit 115-$i$.

The orthogonal demodulation circuit 114-$i$ generates the orthogonally demodulated signal by orthogonally demodulating the received signal supplied from the AGC circuit 113-$i$. The orthogonally demodulated signal is a signal that has been orthogonally demodulated. The orthogonally demodulated signal is supplied to the channel estimator 116-$i$ and signal equalizer 119-$i$.

Figure 3:
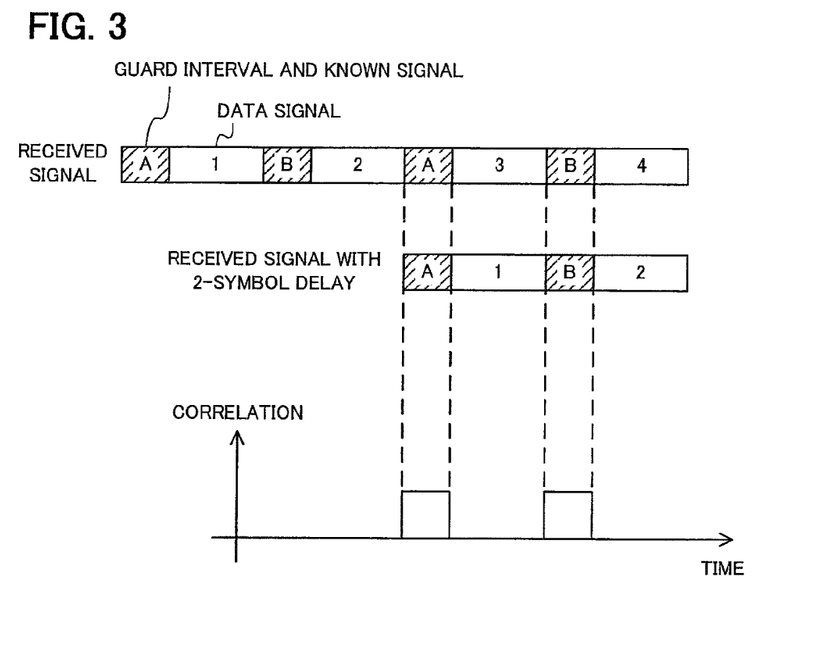
FIG. 3 schematically illustrates the method of generating the enable signal in the first embodiment.

From the received signal received through the antenna, the enable signal generating circuit 115-$i$ generates an enable signal that distinguishes between time periods occupied by the part of the received signal that corresponds to the known signal and time periods occupied by the part of the received signal that corresponds to the data signal. For example, the enable signal generating circuit 115-$i$ generates the enable signal by using the fact that in the part of the received signal corresponding to the known signal, the same signal recurs identically at fixed intervals. If the part of the received signal corresponding to the known signal repeats itself every two symbols as shown in FIG. 3, when the received signal is correlated with a delayed signal obtained by delaying the received signal by two symbols, the correlation of the part of the received signal corresponding to the known signal is higher than the correlation of the part of the received signal corresponding to the data signal. The enable signal generating circuit 115-$i$ uses this property to distinguish between time periods occupied by the part of the received signal corresponding to the known signal and time periods occupied by the part of the received signal corresponding to the data signal and generate the enable signal. The enable signal generating circuit 115-$i$ supplies the generated enable signal to the channel estimator 116-$i$ and signal equalizer 119-$i$.

Returning to FIG. 2, the channel estimator 116-$i$ detects a delay profile from the known signal included in the signal orthogonally demodulated by the orthogonal demodulator 111-$i$ and estimates the channel from the detected delay profile. For example, the channel estimator 116-$i$ detects the delay profile from the orthogonally demodulated signal supplied from the orthogonal demodulation circuit 114-$i$ and uses this delay profile to estimate the channel of the received signal received through antenna 101-$i$.

As shown in FIG. 2, the channel estimator 116-$i$ has a correlation circuit 117-$i$ used as a delay profile detector and a first FFT (Fast Fourier Transform) circuit 118-$i$ used as a first Fourier transform unit.

Figure 4:
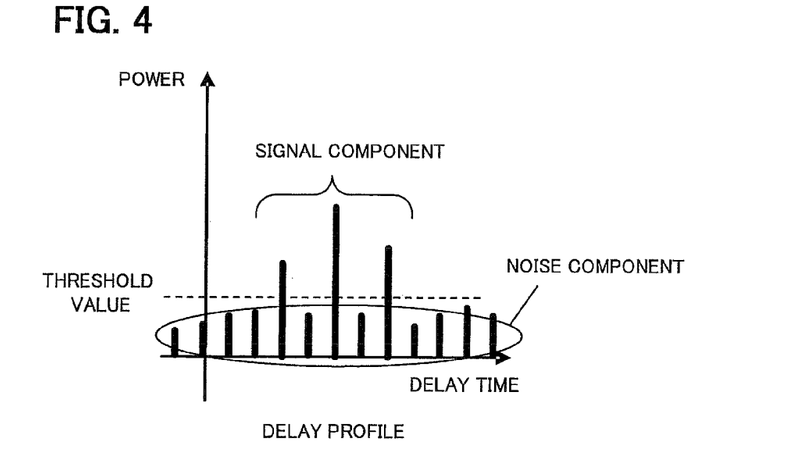
FIG. 4 schematically illustrates a delay profile in the first embodiment.

The correlation circuit 117-$i$ detects the delay profile from the orthogonally demodulated signal supplied from the orthogonal demodulation circuit 114-$i$, and supplies the delay profile to the first FFT circuit 118-$i$ and signal quality estimation circuit 123-$i$. For example, the correlation circuit 117-$i$ refers to the enable signal supplied from the enable signal generating circuit 115-$i$ and extracts the known signal ki from the orthogonally demodulated signal supplied from the orthogonal demodulation circuit 114-$i$. The correlation circuit 117-$i$ calculates the correlation between the received known signal ki and the known signal generated by the known signal generating circuit 140 as a function of time in order to obtain degree of similarity between them. The correlated result is a delay profile representing the propagation characteristic of the channel. FIG. 4 schematically illustrates a delay profile. The horizontal axis in FIG. 4 represents delay time, and the vertical axis represents power. As shown in FIG. 4, the delay profile is made up of discrete signals spaced at the sampling interval of the received signal. The power value is high at delay times at which an arriving signal is present; at delay times at which there is no arriving signal and only noise is present, the power value is low.

Returning to FIG. 2, the first FFT circuit 118-$i$ obtains a channel estimation result by converting the delay profile supplied from the correlation circuit 117-$i$ to the frequency domain. For example, the first FFT circuit 118-$i$ converts the delay profile representing the propagation characteristic of the channel to the frequency domain by performing a fast Fourier transform on the delay profile in a range with a length equal to the symbol length, based at the leading signal in the delay profile, thereby obtaining a channel estimation result for each subcarrier. The first FFT circuit 118-$i$ supplies these channel estimation results to the signal equalizer 119-$i$ and power calculation circuit 122-$i$.

The signal equalizer 119-$i$ uses the channel estimation results obtained by the channel estimator 116-$i$ to equalize the data signal included in the signal orthogonally demodulated by the orthogonal demodulator 111-$i$, and supplies the equalized data signal to the combining circuit 150. For example, the signal equalizer 119-$i$ equalizes the orthogonally demodulated signal supplied from the orthogonal demodulator 111-$i$ on the basis of the delay profile supplied from the correlation circuit 117-$i$.

The signal equalizer 119-$i$ has a second FFT circuit 120-$i$ used as a second Fourier transform unit, and an equalizing circuit 121-$i$.

The second FFT circuit 120-$i$ extracts a data signal ri from the orthogonally demodulated signal supplied from the orthogonal demodulation circuit 114-$i$ and performs a fast Fourier transform on each symbol of the extracted data signal ri. The second FFT circuit 120-$i$ thereby extracts subcarrier signals from the multicarrier signal. The second FFT circuit 120 supplies the extracted subcarrier signals to the equalizing circuit 121-$i$.

The equalizing circuit 121-$i$ uses the subcarrier channel estimation results supplied from the first FFT circuit 118-$i$ to equalize the data signals of the subcarriers it receives from the second FFT circuit 120-$i$. The equalizing circuit 121-$i$ divides the data signal of each subcarrier by the channel estimation result of the same subcarrier to compensate for distortion experienced by the data signal in the channel. The equalizing circuit 121-$i$ supplies the equalized data signals to the combining circuit 150 (see FIG. 1) as equalization result $d_i$.

The power calculation circuit 122-$i$ obtains the power $p_i$ of the channel estimation results supplied from the first FFT circuit 118-$i$ and supplies the power $p_i$ to the combining circuit 150.

The signal quality estimation circuit 123-$i$ calculates a signal quality estimation result $w_i$ on the basis of the delay profile supplied from the correlation circuit 117-$i$ and supplies the signal quality estimation result $w_i$ to the combining circuit 150. For example, the signal quality estimation circuit 123-$i$ estimates the signal quality on the basis of the ratio of the power of the signal component included in the delay profile detected by the channel estimator 116-$i$ to the power of the noise component included in the delay profile detected by the channel estimator 116-$i$. In the first embodiment, this ratio is simply used as the signal quality value.

Figure 5:
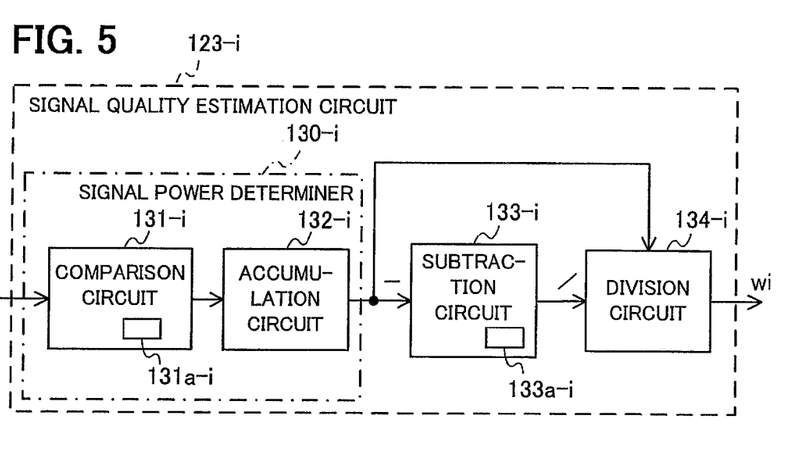
FIG. 5 is a block diagram schematically showing an exemplary signal quality estimation circuit in the first embodiment.

FIG. 5 is a block diagram schematically showing an exemplary signal quality estimation circuit 123-$i$. The signal quality estimation circuit 123-$i$ has a signal power determiner 130-$i$, a subtraction circuit 133-$i$ used as a noise power determiner, and a division circuit 134-$i$ used as a signal quality calculator.

The signal power determiner 130-$i$ determines the power of the signal component (referred to below as the signal power) included in the delay profile detected by the channel estimator 116-$i$. The signal power determiner 130-$i$ has a comparison circuit 131-$i$ used as a signal component detector and an accumulation circuit 132-$i$ used as signal power calculator.

From the delay profile detected by the channel estimator 116-$i$, the comparison circuit 131-$i$ detects components having power equal to or greater than a threshold value. For example, the comparison circuit 131-$i$ compares the delay profile supplied from the correlation circuit 117-$i$ with a predetermined threshold value, and supplies only those components of the delay profile that exceed the predetermined threshold value to the accumulation circuit 132-$i$. If the components of the delay profile that exceed the predetermined threshold value are regarded as signal components of the arriving signal, then the set of components that exceed the predetermined threshold value becomes the signal component. It will be assumed that the predetermined threshold value is stored in a memory 131$a$-$i$ used as a threshold value storage unit.

An exemplary method of determining the predetermined threshold value is to obtain it from the delay profile. The component with the highest value in the delay profile is regarded as the main signal of the signal component, and the power value is divided by a fixed value and the value to obtain the threshold value. A method of setting the fixed value to divide by is to find the maximum fixed value such that for anticipated channels, the comparison circuit 131-$i$ will exclude error (that is, the comparison circuit 131-$i$ will output only signal components and will not output noise components), and set this maximum value as the fixed value. If the fixed value to divide by is set to '5', for example, components of the delay profile that are attenuated by approximately 14 dB or more from the power of the main signal are regarded as noise. When this method is used, the threshold value increases as the power of the component with the maximum value in the delay profile increases.

The comparison circuit 131-$i$ may vary the predetermined threshold value in response to the control voltage that adjusts the signal level in the AGC circuit 113-$i$. When the control voltage is high and the amplification factor of the received signal is high, the noise component also increases. When the control voltage is low and the amplification factor of the received signal is low, the noise component also decreases. That is, the noise power is proportional to the control voltage. The accuracy with which signal quality is estimated can be improved by having the comparison circuit 131-$i$ vary the threshold value in proportion to the control voltage.

The accumulation circuit 132-$i$ calculates the power of the signal component by summing the power values detected by the comparison circuit 131-$i$. For example, the accumulation circuit 132-$i$ calculates a cumulative sum of the signal components supplied from the comparison circuit 131-$i$ to obtain the signal power as the total power of the signal components.

If, for example, the comparison circuit 131-$i$ were to output the noise components instead of the signal components and the accumulation circuit 132-$i$ were to calculate the noise power, the number of inputs to the accumulation circuit 132-$i$ would increases as compared with calculating the signal power. The number of addition operations performed in the accumulation circuit 132-$i$ can therefore be reduced by having the comparison circuit 131-$i$ output the signal components equal to or greater than the predetermined threshold value instead of outputting the noise components equal to or less than the predetermined threshold value.

The accumulation circuit 132-$i$ outputs the calculated power of the signal component to the subtraction circuit 133-$i$ and division circuit 134-$i$.

The subtraction circuit 133-$i$ determines the power of the noise component (referred to below as the noise power) included in the delay profile detected by the channel estimator 116-$i$. For example, the subtraction circuit 133-$i$ calculates the noise power by subtracting the signal power supplied from the accumulation circuit 132-$i$ from the total power of the delay profile. Since the received signal is controlled by the AGC circuit 113-$i$ so that its total power is always close to the same value, the subtraction circuit 133-$i$ uses a fixed value based on the predetermined reference level as the total power. It will be assumed that the fixed value is stored in a memory 133$a$-$i$ used as a fixed value storage unit. It then becomes unnecessary to calculate the total power of the delay profile by cumulative addition of the delay profile supplied from the correlation circuit 117-$i$.

The total power of the delay profile in a predetermined channel may be determined and set here as the fixed value of the total power. A channel free from bursts of noise that do not occur under normal conditions is preferably used as the predetermined channel.

The subtraction circuit 133-$i$ supplies the calculated power of the noise component to the division circuit 134-$i$.

The division circuit 134-$i$ calculates the ratio of the power of the signal component determined by the signal power determiner 130-$i$ to the power of the noise component determined by the subtraction circuit 133-$i$. For example, the division circuit 134-$i$ divides the power of the signal component supplied by the signal power determiner 130-$i$ by the power of the noise component supplied by the subtraction circuit 133-$i$ to obtain a signal quality estimation result $w_i$. The division circuit 134-$i$ supplies the signal quality estimation result $w_i$ thus obtained to the combining circuit 150.

An averaging circuit (not shown), for example, may be further provided as an averaging stage following the division circuit 134-$i$. The averaging circuit may store a predetermined number of outputs calculated by the division circuit 134-$i$ from a plurality of delay profiles, take their average value, and supply the average value to the combining circuit 150 as the signal quality estimation result $w_i$.

Returning to FIG. 1, the known signal generating circuit 140 generates the known signal and supplies the generated known signal to the correlation circuit 117-$i$ (see FIG. 2). For example the known signal generating circuit 140 stores data on which the known signal is based in a memory 140$a$ and generates the known signal from the data.

The combining circuit 150 performs diversity combining on the basis of the outputs from the plurality of demodulation modules 110-1 to 110-N. For example, the combining circuit 150 performs diversity combining on the equalization results $d_i$ supplied from the equalizing circuits 121-$i$ on the basis of the signal quality estimation results $w_i$ supplied from the signal quality estimation circuits 123-$i$ and the powers $p_i$ of the channel estimation results supplied from the power calculation circuits 122-$i$, and outputs the combined signal c to the FEC circuit 160. The combining circuit 150 performs diversity combining by using, for example, the equation (2) given above.

Alternatively, the combining circuit 150 may perform diversity combining by using the selective combining method. In the selective combining method, the combining circuit 150 uses only the data signal from the antenna for which the product of the power $p_i$ of the channel estimation result and the signal quality estimation result $w_i$ is maximal, as in the equation (3) below, and ignores the signals from the other antennas.

$$c = \sum_{i=1}^{N} m_i d_i \quad (3)$$

$$\left( m_i = \begin{cases} 1 & (p_i w_i = \max(p_1 w_1, p_2 w_2, \ldots, p_N w_N)) \\ 0 & (\text{otherwise}) \end{cases} \right)$$

The FEC circuit 160 generates an output signal by decoding an error correcting code. The output of the FEC circuit 160 becomes the output of the receiving device 100.

In the method disclosed by Sugimoto et al., signal quality is estimated from the result of equalization of the received known signal, which necessitates a circuit to equalize the known signal. In contrast, the receiving device 100 in the first embodiment does not need to equalize the known signal because it estimates signal quality from the delay profile. The circuit size and amount of computation can be reduced accordingly.

Second Embodiment

As shown in FIG. 1, the receiving device 200 according to the second embodiment has N demodulation modules 210-1 to 210-N, a known signal generating circuit 140, a combining circuit 150, and an FEC circuit 160. The demodulation modules 210-1 to 210-N are connected to corresponding antennas 101-1 to 101-N. The receiving device 200 in the second embodiment differs from the receiving device 100 in the first embodiment in regard to the demodulation modules 210-1 to 210-N.

Since the N demodulation modules 210-1 to 210-N are structurally identical, a single representative demodulation module 210-$i$ will be described below.

As shown in FIG. 2, demodulation module 210-$i$ has an orthogonal demodulator 111-$i$, an enable signal generating circuit 115-$i$, a channel estimator 116-$i$, a signal equalizer 119-$i$, a power calculation circuit 122-$i$, and a signal quality estimation circuit 223-$i$. Demodulation module 210-$i$ in the second embodiment differs from demodulation module 110-$i$ in the first embodiment in regard to the signal quality estimation circuit 223-$i$.

Figure 6:
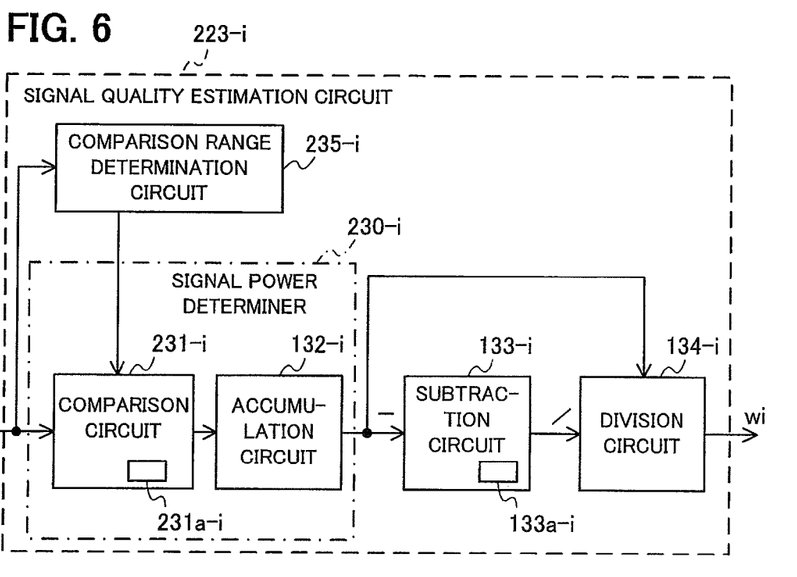
FIG. 6 is a block diagram schematically showing an exemplary signal quality estimation circuit in the second embodiment.

FIG. 6 is a block diagram schematically showing an exemplary signal quality estimation circuit 223-$i$ in the second embodiment.

The signal quality estimation circuit 223-$i$ has a signal power determiner 230-$i$, a subtraction circuit 133-$i$, a division circuit 134-$i$, and a comparison range determination circuit 235-$i$ used as a comparison range determiner. The signal quality estimation circuit 223-$i$ in the second embodiment differs from the signal quality estimation circuit 123-$i$ in the first embodiment in regard to the processing in the signal power determiner 230-$i$ and in the addition of the comparison range determination circuit 235-$i$. The signal power determiner 230-$i$ in the second embodiment has a comparison circuit 231-$i$ and an accumulation circuit 132-$i$. The signal power determiner 230-$i$ in the second embodiment differs from the signal power determiner 130-$i$ in the first embodiment in regard to the processing in the comparison circuit 231-$i$.

The comparison range determination circuit 235-$i$ determines the range within which components having power values equal to or greater than a threshold value are detected in the delay profile detected by the channel estimator 116-$i$. For example, the comparison range determination circuit 235-$i$ estimates a range of delay times over which the comparison circuit 231-$i$ should perform a comparison with the threshold value, and supplies the estimated comparison range to the comparison circuit 231-$i$.

The comparison circuit 231-$i$ compares the part of the delay profile situated in the comparison range supplied from the comparison range determination circuit 235-$i$ with the threshold value, and supplies only components exceeding the threshold value to the accumulation circuit 132-$i$ in the next stage. As the threshold value, it will be assumed that a predetermined threshold value stored in a memory 231$a$-$i$ is used.

Figure 7:
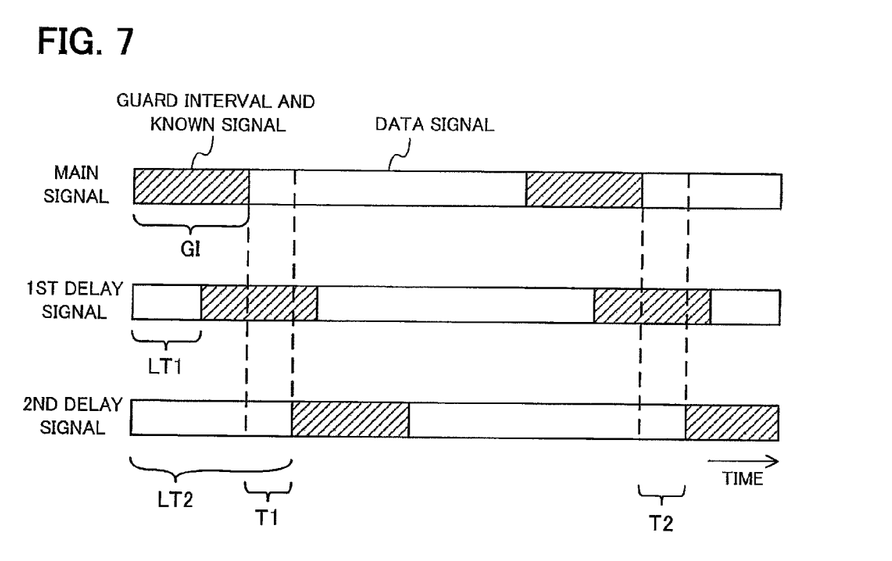
FIG. 7 shows examples of a main signal and delayed signals in the second embodiment.

In a multipath environment, the signal component in the channel delay profile is the sum of a main signal and delayed signals. FIG. 7 schematically shows an exemplary main signal and a pair of delayed signals. In a transmission environment in which a delay time LT1 of a delayed signal is shorter than the guard interval GI, as shown for the first delayed signal in FIG. 7, data interference is avoided. In a transmission environment in which a delay time LT2 of a delayed signal is longer than the guard interval GI, as shown for the second delayed signal in FIG. 7, data interference occurs in time intervals T1 and T2. In data interference, the interfering data signals function as noise. When data interference occurs between the main signal and a delayed signal, the reliability of the delayed signal is degraded by the high power of the main signal.

Figure 8:
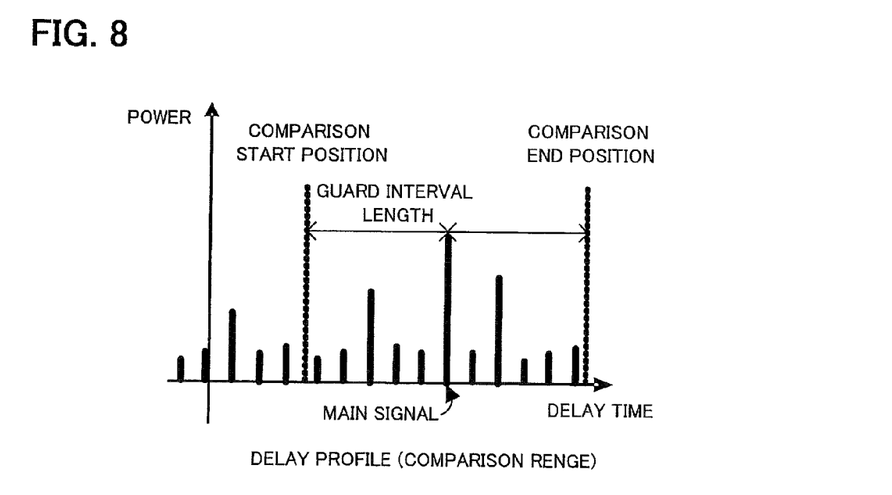
FIG. 8 schematically illustrates the comparison range in the second embodiment.

Therefore, in one exemplary comparison range estimation scheme, the comparison range determination circuit 235-$i$ can search for the main signal, which has maximum power in the delay profile, and set a range extending by plus/minus the guard interval length from the main signal as the comparison range, as shown in FIG. 8. Then the comparison circuit 231-$i$ will not carry out comparisons for delayed signals for which data interference with the main signal could occur but will treat them as noise, thereby improving the accuracy of signal quality estimation.

The effect of the second embodiment is that the accuracy of signal quality estimation can be improved by limiting the range of comparisons performed in the comparison circuit 231-$i$. A further advantageous effect is that since the comparison range in the comparison circuit 231-$i$ is reduced, the amount of computation is reduced.

Third Embodiment

As shown in FIG. 1, the receiving device 300 according to the third embodiment has N demodulation modules 310-1 to 310-N, a known signal generating circuit 140, a combining circuit 150, and an FEC circuit 160. The demodulation modules 310-1 to 310-N are connected to corresponding antennas 101-1 to 101-N. The receiving device 300 in the third embodiment differs from the receiving device 100 in the first embodiment in regard to the demodulation modules 310-1 to 310-N.

Since the N demodulation modules 310-1 to 310-N are structurally identical, a single representative demodulation module 310-$i$ will be described below.

As shown in FIG. 2, demodulation module 310-$i$ has an orthogonal demodulator 111-$i$, an enable signal generating circuit 115-$i$, a channel estimator 116-$i$, a signal equalizer 119-$i$, a power calculation circuit 122-$i$, and a signal quality estimation circuit 323-$i$. Demodulation module 310-$i$ in the third embodiment differs from demodulation module 110-$i$ in the first embodiment in regard to the signal quality estimation circuit 323-$i$.

Figure 9:
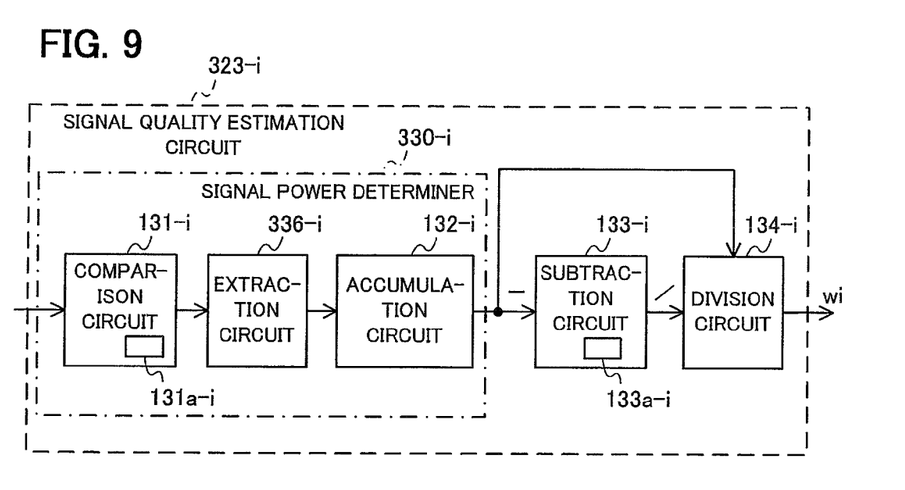
FIG. 9 is a block diagram schematically showing an exemplary signal quality estimation circuit in the third embodiment.

FIG. 9 is a block diagram schematically showing an exemplary signal quality estimation circuit 323-$i$ in the third embodiment.

The signal quality estimation circuit 323-$i$ has a signal power determiner 330-$i$, a subtraction circuit 133-$i$, and a division circuit 134-$i$. The signal quality estimation circuit 323-$i$ in the third embodiment differs from the signal quality estimation circuit 123-$i$ in the first embodiment in regard to the signal power determiner 330-$i$. The signal power determiner 330-$i$ in the third embodiment has a comparison circuit 131-$i$, an accumulation circuit 132-$i$, and an extraction circuit 336-$i$ used as an extractor. The signal power determiner 330-$i$ in the third embodiment differs from the signal power determiner 130-$i$ in the first embodiment in the insertion of the extraction circuit 336-$i$ between the comparison circuit 131-$i$ and the accumulation circuit 132-$i$. The comparison circuit 131-$i$ supplies the extraction circuit 336-$i$ with those components of the delay profile that exceed a predetermined threshold value. The accumulation circuit 132-$i$ takes the cumulative sum of the signal components supplied from the extraction circuit 336-$i$.

From among the signal components supplied by the comparison circuit 131-$i$, the extraction circuit 336-$i$ extracts and outputs up to a fixed number of components in descending order of power, starting from the component with the highest power. In an environment with a plurality of delayed signals, this enables low power delayed signals that include substantial noise to be treated as noise, thereby improving the accuracy of signal quality estimation.

Figure 10:
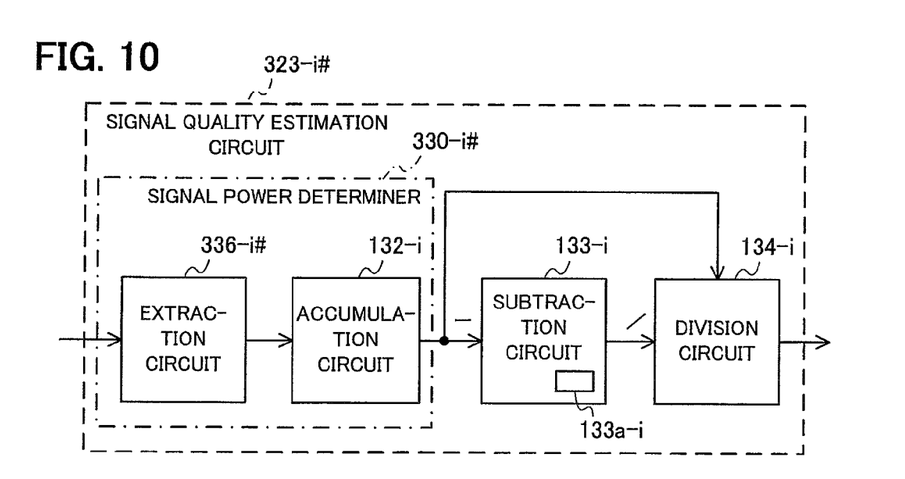
FIG. 10 is a block diagram schematically showing a variation of the signal quality estimation circuit in the third embodiment.

When the number of arriving signals is predictable to some extent, the comparison circuit 131-$i$ can be dispensed with as in the signal quality estimation circuit 323-$i$# in FIG. 10. In this case the extraction circuit 336-$i$# can take and output the largest components from the delay profile, taking a number of components equal to the expected number of signal components.

The third embodiment can improve the quality of signal quality estimation by treating only up to a fixed number of components as signal components. A further advantageous effect is that the amount of computation in the accumulation circuit 132-$i$ is reduced.

The configuration of the third embodiment can be modified by adding the comparison range determination circuit 235-$i$ and using the comparison circuit 231-$i$ of the second embodiment.

Fourth Embodiment

As shown in FIG. 1, the receiving device 400 according to the fourth embodiment has N demodulation modules 410-1 to 410-N, a known signal generating circuit 140, a combining circuit 150, and an FEC circuit 160. The demodulation modules 410-1 to 410-N are connected to corresponding antennas 101-1 to 101-N. The receiving device 400 in the fourth embodiment differs from the receiving device 100 in the first embodiment in regard to the demodulation modules 410-1 to 410-N.

Since the N demodulation modules 410-1 to 410-N are structurally identical, a single representative demodulation module 410-$i$ will be described below.

Figure 11:
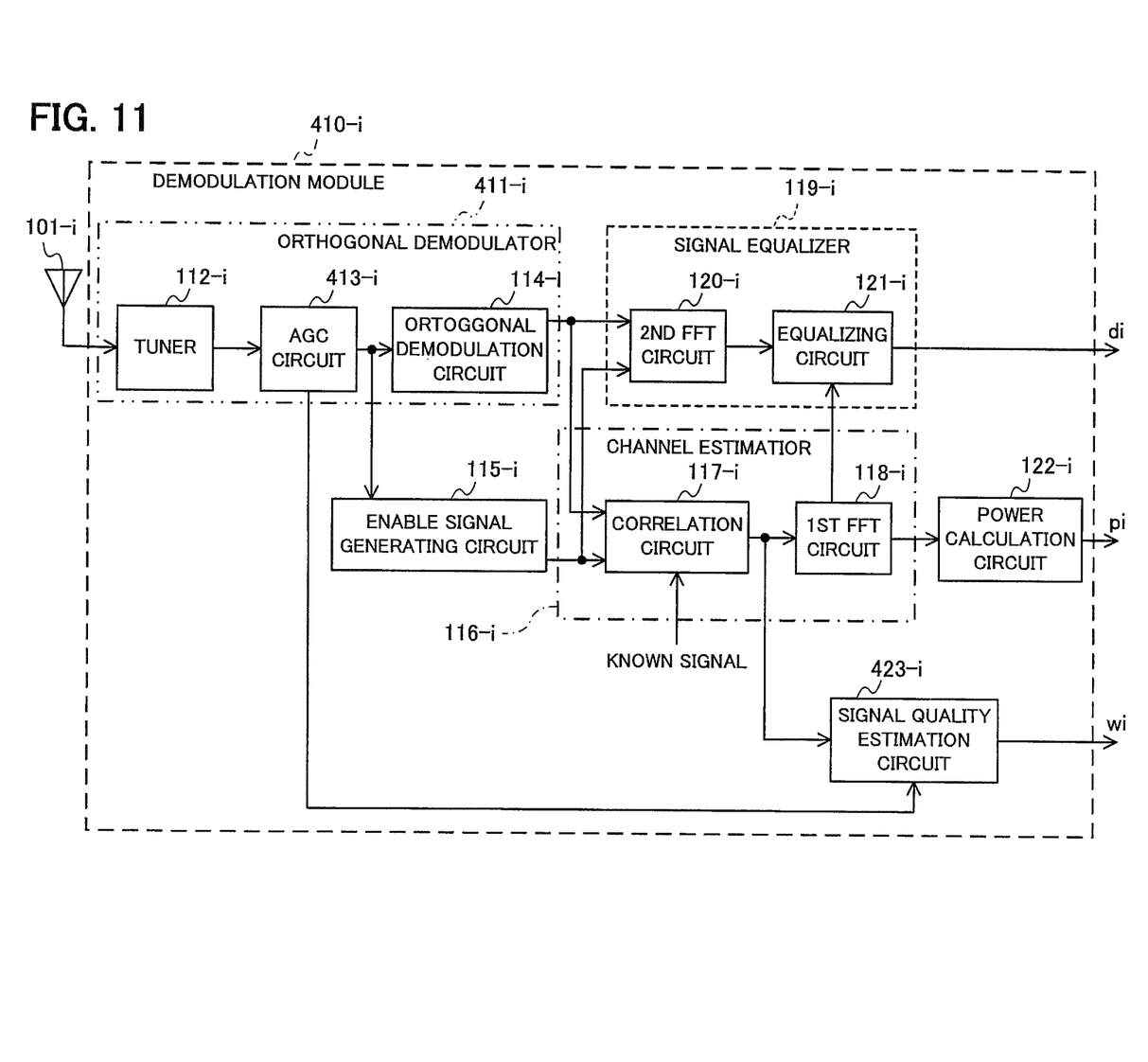
FIG. 11 is a block diagram schematically showing the structure of the demodulation module in the fourth embodiment.

FIG. 11 is a block diagram schematically showing the structure of demodulation module 410-$i$.

As shown in FIG. 11, demodulation module 410-$i$ has an orthogonal demodulator 411-$i$, an enable signal generating circuit 115-$i$, a channel estimator 116-$i$, a signal equalizer 119-$i$, a power calculation circuit 122-$i$, and a signal quality estimation circuit 423-$i$. Demodulation module 410-$i$ in the fourth embodiment differs from demodulation module 110-$i$ in the first embodiment in regard to the orthogonal demodulator 411-$i$ and signal quality estimation circuit 423-$i$.

The orthogonal demodulator 411-$i$ has a tuner 112-$i$, an AGC circuit 413-$i$, and an orthogonal demodulation circuit 114-$i$. The orthogonal demodulator 411-$i$ in the fourth embodiment differs from the orthogonal demodulator 111-$i$ in the first embodiment in regard to the AGC circuit 413-$i$.

As in the first embodiment, the AGC circuit 413-$i$ adjusts the received signal received through antenna 101-$i$ to a predetermined signal level and supplies the received signal, adjusted to the predetermined signal level, to the orthogonal demodulation circuit 114-$i$ and enable signal generating circuit 115-$i$. Differing from the first embodiment, the AGC circuit 413-$i$ supplies the control voltage with which it performs signal level control to the signal quality estimation circuit 423-$i$.

Figure 12:
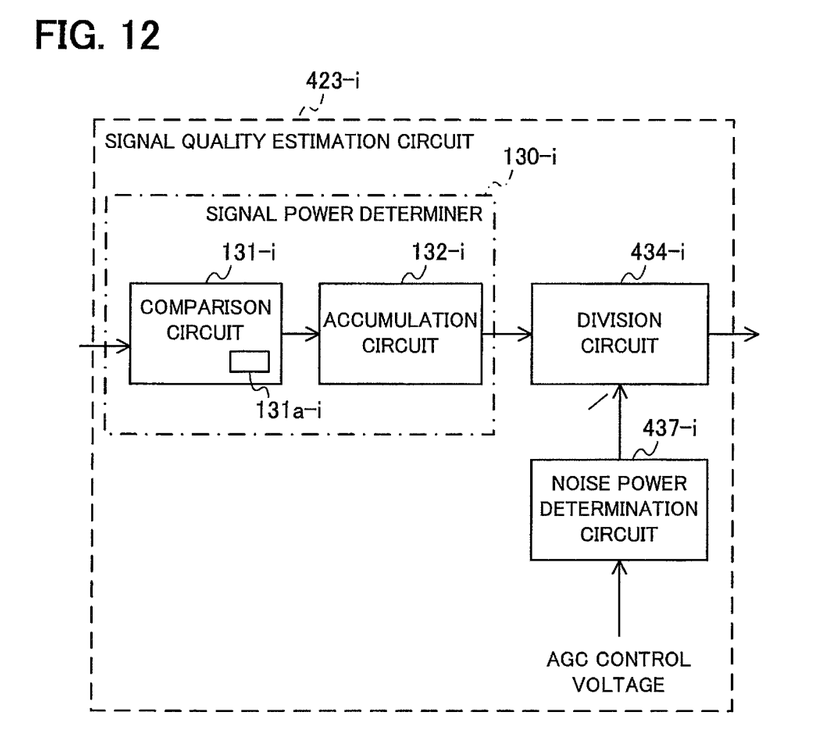
FIG. 12 is a block diagram schematically showing an exemplary signal quality estimation circuit in the fourth embodiment.

FIG. 12 is a block diagram schematically showing an exemplary signal quality estimation circuit 423-$i$ in the fourth embodiment.

The signal quality estimation circuit 423-$i$ has a signal power determiner 130-$i$, a division circuit 434-$i$, and a noise power determination circuit 437-$i$ used as a noise power determiner. The signal quality estimation circuit 423-$i$ in the fourth embodiment differs from the signal quality estimation circuit 123-$i$ in the first embodiment by additionally having the noise power determination circuit 437-$i$, and also differs in the processing performed in the division circuit 434-$i$.

The noise power determination circuit 437-$i$ estimates the power of the noise component from the AGC control voltage received from the AGC circuit 413-$i$, and supplies the estimated noise power to the division circuit 434-$i$. If substantially equivalent noise components are received at all of the antennas 101-1 to 101-N, the noise power ratios among the demodulation modules 410-1 to 410-N depend on the control voltages that determine the amounts of amplification or attenuation in the AGC circuits 413-1 to 413-N. In the estimation of signal quality in the fourth embodiment, the noise power is regarded as a value that depends on the control voltages of the AGC circuits 413-1 to 413-N. In the fourth embodiment, on the presumption that the value of the noise power depends on the control voltages of the AGC circuits 413-1 to 413-N, the signal quality is estimated. For example, as the amplification factor specified by the AGC control voltage received from the AGC circuit 413-$i$ increases, the noise power determination circuit 437-$i$ estimates an increasingly high value for the noise power, and as the attenuation factor specified by the AGC control voltage received from the AGC circuit 413-$i$ decreases, the noise power determination circuit 437-$i$ estimates an increasingly low value for the noise power. The noise power determination circuit 437-$i$ supplies the estimated noise power to the division circuit 434-$i$. In one exemplary configuration the noise power determination circuit 437-$i$ simply outputs the AGC control voltage as the noise power.

The division circuit 434-$i$ divides the signal power supplied from the accumulation circuit 132-$i$ by the noise power supplied from the noise power determination circuit 437-$i$ to obtain the signal quality estimation result $w_i$. The signal quality estimation result $w_i$ obtained by the noise power determination circuit 437-$i$ is supplied to the combining circuit 150.

Since the control voltage of the AGC circuit 413-$i$ is regarded as the noise power when signal quality is estimated in the fourth embodiment, the subtraction circuit 133-$i$ in the first embodiment is unnecessary. The circuit size and amount of computation can be reduced accordingly. In addition the total power value used by the subtraction circuit 133-$i$ is unnecessary, so the accuracy of signal quality estimation is not degraded by error in estimating the total power.

The configuration of the fourth embodiment can be modified by adding the comparison range determination circuit 235-*i* and comparison circuit 231-*i* of the second embodiment.

The invention is not limited to the diversity combining schemes described by equations (2) and (3) that are used in the foregoing first to fourth embodiments.

For example, diversity combining can be carried out by use of equation (4) or (5) below.

$$c = \sum_{i=1}^{N} l_i d_i \quad (4)$$

$$\left( l_i = w_i \bigg/ \sum_{j=1}^{N} w_j \right)$$

$$c = \sum_{i=1}^{N} m_i d_i \quad (5)$$

$$\left( m_i = \begin{cases} 1 & (w_i = \max(w_1, w_2, \ldots, w_N)) \\ 0 & (\text{otherwise}) \end{cases} \right)$$

When these equations are used, the power calculation circuit 122 need not be provided in the receiving device 100, 200, 300, or 400.

Those skilled in the art will recognize that further variations are possible within the scope of the invention, which is defined in the appended claims.

What is claimed is:

1. A receiving device comprising:
a plurality of demodulating modules for receiving, through a plurality of antennas, a digital broadcast signal including a data signal and also including a known signal transmitted on a single carrier separate from the data signal; and
a combiner for performing diversity combining based on respective outputs of the plurality of demodulating modules; wherein
each one of the demodulating modules includes
an orthogonal demodulator for orthogonally demodulating a signal received at one of the plurality of antennas,
a channel estimator for detecting a delay profile from the known signal included in the orthogonally demodulated signal obtained by the orthogonal demodulator, and using the detected delay profile to perform channel estimation, thereby generating a channel estimation result,
a signal equalizer for using the channel estimation result to equalize the data signal included in the orthogonally demodulated signal obtained by the orthogonal demodulator, and supplying the equalized data signal to the combiner, and
a signal quality estimator for estimating signal quality from a ratio of a power of a signal component included in the delay profile detected by the channel estimator and a power of a noise component included in the delay profile detected by the channel estimator, and supplying a signal quality estimation result to the combiner;
the signal quality estimator includes
a signal power determiner for determining the power of the signal component included in the delay profile detected by the channel estimator,
a noise power determiner for determining the power of the noise component included in the delay profile detected by the channel estimator, and
a signal quality calculator for calculating the signal quality estimation as the ratio of the power of the signal component determined by the signal power determiner to the power of the noise component determined by the noise power determiner; and
in performing diversity combining, the combiner weights the data signals equalized by the demodulating modules on a basis of the signal quality estimation results obtained from the signal quality calculators.

2. The receiving device of claim 1, wherein the signal power determiner further comprises:
a signal component detector for detecting, from the delay profile detected by the channel estimator, components having power equal to or greater than a threshold value; and
a signal power calculator for calculating the power of the signal component by summing powers of the components detected by the signal component detector.

3. The receiving device of claim 1, wherein the signal power determiner further comprises:
an extractor for extracting, from the delay profile detected by the channel estimator, a predetermined number of components in descending order of power; and
a signal power calculator for calculating the power of the signal component by summing powers of the components extracted by the extractor.

4. The receiving device of claim 2, wherein the noise power determiner determines the power of the noise component by subtracting the power of the signal component determined by the signal power determiner from a predetermined power.

5. The receiving device of claim 3, wherein the noise power determiner determines the power of the noise component by subtracting the power of the signal component determined by the signal power determiner from a predetermined power.

6. The receiving device of claim 2, wherein:
the orthogonal demodulator further comprises a gain adjuster for adjusting a signal level of the signal received at the one of the plurality of antennas to a predetermined signal level; and
the noise power determiner determines the power of the noise component from an amplification factor used in the gain adjuster such that the power of the noise component increases as the amplification factor used in the gain adjuster increases.

7. The receiving device of claim 3, wherein:
the orthogonal demodulator further comprises a gain adjuster for adjusting a signal level of the signal received at the one of the plurality of antennas to a predetermined signal level; and
the noise power determiner determines the power of the noise component from an amplification factor used in the gain adjuster such that the power of the noise component increases as the amplification factor used in the gain adjuster increases.

8. A receiving method comprising:
receiving a digital broadcast signal through a plurality of antennas to obtain a corresponding plurality of received signals, the digital broadcast signal including a data signal and a known signal, the known signal being transmitted on a single carrier separate from the data signal;
orthogonally demodulating each one of the received signals to obtain a plurality of orthogonally demodulated signals including respective data signals and known signals;
performing channel estimation by detecting a delay profile from the known signal included in each one of the orthogonally demodulated signals, thereby generating a corresponding channel estimation result;

equalizing the data signal in each one of the orthogonally demodulated signals by using the corresponding channel estimation result, thereby obtaining a plurality of equalized data signals;

estimating a signal quality of each one of the equalized data signals from the delay profile detected during channel estimation, thereby obtaining a plurality of signal quality estimates; and performing diversity combining by weighting the equalized data signals on a basis of the signal quality estimates and combining the weighted equalized data signals; wherein estimating the signal quality of each one of the equalized data signals further comprises determining a power of a signal component included in the delay profile, determining a power of a noise component included in the delay profile, and estimating the signal quality as a ratio of the power of the signal component to the power of the noise component.

9. The receiving method of claim 8, wherein determining the power of the signal component further comprises:

detecting components of the delay profile having power equal to or greater than a threshold value; and calculating the power of the signal component by summing powers of the detected components.

10. The receiving method of claim 8, wherein determining the power of the signal component further comprises:

extracting a predetermined number of components in descending order of power from the delay profile; and calculating the power of the signal component by summing powers of the extracted components.

11. The receiving method of claim 9, wherein determining the power of the noise component further comprises subtracting the power of the signal component from a predetermined power.

12. The receiving method of claim 10, wherein determining the power of the noise component further comprises subtracting the power of the signal component from a predetermined power.

13. The receiving method of claim 9, wherein:

orthogonally demodulating each one of the received signals further comprises varying an amplification factor to adjust a signal level of the received signal to a predetermined signal level; and determining the power of the noise component further comprises increasing the power of the noise component as the amplification factor increases.

14. The receiving method of claim 10, wherein:

orthogonally demodulating each one of the received signals further comprises varying an amplification factor to adjust a signal level of the received signal to a predetermined signal level; and determining the power of the noise component further comprises increasing the power of the noise component as the amplification factor increases.

* * * * *